Patented Nov. 8, 1932

1,887,157

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REFINING ROSIN

No Drawing.   Application filed January 14, 1928.   Serial No. 246,903.

My invention relates to a method of refining rosin, more particularly wood rosin.

Wood rosin, obtained from stump wood by extraction with a solvent, as for example, gasoline, is known to contain certain color bodies which, while they do not under ordinary circumstances cause discoloration of the rosin, will darken and produce discoloration when the rosin is subjected to the action of oxygen and an alkali, as for example, in rosin soaps, limed varnishes and sizing for paper. As a result of the presence in wood rosin of the color bodies of the type indicated, which may be termed latent color bodies and which cannot be removed by the ordinary distillation methods, such rosin cannot be used in soaps, limed varnishes and sizing for paper where a product of light color is required, since on aging the product will discolor because of oxidation and, where for example, the rosin is used in soap, the soap adjacent to the surface exposed to the air will, on aging, become dark with gradual increase in depth of the darkened area.

Now it is the object of my invention to provide a method whereby the objectionable color bodies may be removed from wood rosin in an effective and relatively inexpensive manner and such rosin may be rendered available for use in the production of light colored soaps, limed varnishes, sizing and the like.

According to my invention, I subject the rosin to be refined to treatment with an aldehyde and a condensing agent therefor, preferably with subsequent distillation under reduced pressure. Alternatively, I may subject the rosin to be refined to treatment with a substance containing an active methylene (CH$_2$) group, such as hexamethylenetetramine or trioxymethylene followed by distillation, under reduced pressure; and the rosin may be subjected to treatment as such followed by distillation or in solution in a solvent therefor with or without distillation.

In the practice of my invention it will be understood that the condensation product formed with the color body when an aldehyde and a condensing agent are used, may be separated from the rosin by distillation, or, if the reaction is carried out in a solvent for the rosin in which the compound is insoluble or only slightly soluble, the condensation product formed may be removed by filtration, but in order to remove other types of color bodies as visible color bodies, distillation, or other treatment is also necessary.

In the practice of my invention I may use, for example, as the aldehyde, formaldehyde, acetaldehyde, and the like; as the condensing agent I may use ammonia, tartaric acid, an inorganic acid, as hydrochloric, a salt such as ammonium chloride, zinc chloride, and the like; I may use instead of an aldehyde plus a condensation agent, hexamethylenetetramine, trioxymethylene, or other substance containing an active methylene group. If the rosin is subjected to treatment in solution, I may use as the solvent for the rosin, gasoline, or other light petroleum distillate, as naphtha, ethyl alcohol, methyl alcohol, ether, acetone, carbon tetrachloride, and the like, it being understood that in selecting a solvent for the rosin one should be chosen in which the compound formed between the aldehyde and the color body of the rosin will be substantially insoluble or at least only slightly soluble.

As an example of the carrying out of the process in accordance with my invention for the refining of wood rosin with the use of an aldehyde and a condensing agent, a quantity of rosin, preferably in solution, is heated with an aldehyde, as for example, formaldehyde, a small quantity of ammonia being added. As a result of the reaction between the formaldehyde, the ammonia and the color bodies, an insoluble product will be formed.

The refined rosin may then be readily separated from the color body complex and any excess reagent by, for example, distilling off the rosin, or where the rosin is treated in solution, by filtering out the insoluble product formed and recovering the rosin from the solvent. The recovered rosin will be found relatively free from those color bodies the removal of which is desired and will be available for use, for example, in the making of soap, limed varnish, sizing, etc.

In the carrying out of my invention, if desired, the rosin may be treated with an aldehyde, preferably formaldehyde to which is added an organic condensing agent, such as tartaric acid, or an inorganic acid, such as hydrochloric, or a salt, such as ammonium chloride instead of ammonia. In the carrying out of my invention, if desired, there may be added hexamethylenetetramine, the condensation product of ammonia and formaldehyde, or trioxymethylene, and if desired a small amount of ammonia may be employed in conjunction with either of the foregoing.

In the practice of the method in accordance with my invention, rosin in solution may be subjected to treatment. For example, the rosin may be dissolved in gasoline, ethyl alcohol, methyl alcohol, acetone, ether, carbon tetrachloride, or the like, and then subjected to treatment with an aldehyde and a condensation agent, or alternatively with a substance containing an active methylene group, as hexamethylenetetramine. The treatment of the rosin in solution with an aldehyde and a condensation agent results in the formation of a product from the color body of the rosin, which is insoluble in the rosin solvent and which separates from the rosin solution as a precipitate. In the treatment of the rosin solution, the solution may be heated under pressure and on the formation of the insoluble color body complex, the solution is separated therefrom and the rosin recovered from the solution by, for example, distilling off the solvent. The rosin solution, after separation from the insoluble condensation product, may desirably be washed with water before recovery of the rosin therefrom and the solution may also, with or without omission of the water wash, be desirably washed with a dilute aqueous mineral acid solution, as for example, dilute sulphuric acid, or dilute hydrochloric acid, or the like. After recovery of the rosin from the rosin solution, the rosin may be subjected to distillation in order to further refine it.

As a more specific example of the carrying out of the process embodying my invention, rosin for the purpose of illustration being treated in solution, to say 600 parts of the solution of wood rosin in gasoline containing say 78 parts of ordinary wood rosin, there is added 4 parts of hexamethylenetetramine. On refluxing for about 6 hours at a temperature of say about 100° C. the hexamethylenetetramine will dissolve and subsequently combine with the color bodies, the reaction product separating from the solution as a brown precipitate. After the precipitation of this insoluble product, the gasoline-rosin solution is separated therefrom, for example, by filtration, centrifugation, or the like method, and washed with water, after which the gasoline is distilled off and there will be obtained about 74 parts of refined rosin, which while giving a rather dark soap, will not appreciably discolor on aging.

As a further example of the carrying out of the process embodying my invention with the use of formaldehyde and ammonia for the treatment of rosin in solution, about 600 parts of a gasoline solution of ordinary wood rosin containing 78 parts of rosin are refluxed for six hours with 20 parts of formaldehyde solution, containing about 35% formaldehyde, and 15 parts of ammonia water. The precipitate which forms is filtered off with recovery of 72 grams of rosin, which is subsequently distilled. The distillate yields a soap which is substantially free from discoloration and which will not discolor on aging. If desired, say about 10 grams of ammonium chloride may be substituted for the ammonia water.

As an example of the carrying out of the process according to my invention for the treatment of rosin as such, for example, 1.5 parts of hexamethylenetetramine are added to 150 parts of wood rosin. The rosin is then distilled under ½" mercury pressure, with a yield of about 114 parts of distilled rosin. The distilled rosin will not be as light in color as ordinary distilled rosin, but will yield a soap which will be substantially free from discoloration and which will not discolor on aging.

If it is desired to obtain a more highly refined rosin, the rosin solution after separation from the precipitated color body product and after being washed with water, may be desirably washed with dilute sulphuric acid, say for example, of a concentration of about 1%. The acid wash will act to remove any of the condensation product remaining in the solution and also to remove any excess hexamethylenetetramine. After the acid wash the rosin may be recovered from the gasoline solution by distilling off the gasoline. If a pale rosin is desired for the production of a light colored soap, the refined rosin recovered from the gasoline solution should be subjected to one or another of the heretofore known processes for refining rosin as, for example, distillation, for its further refinement. For example, 74 parts of rosin recovered from the rosin solution according to the above illustration will, on distillation, give about 61 parts of rosin grading N in color and which will give a soap light in color and which will not discolor on aging.

If desired, the rosin also may be further refined by treating the rosin solution after separation from the color body complex, as, for example, by agitating with fuller's earth, activated carbon, etc. The agitation with an absorbing agent, as fuller's earth, or the like, may be substituted for distillation of the rosin after it is recovered from the treated solution.

In carrying out the process in accordance with my invention, it will be understood that, when the rosin is treated in solution, if desired the rosin may first be distilled, then dissolved in a solvent, then treated with an aldehyde and a condensing agent and finally recovered and it will be further understood that my invention contemplates the use of any solvent for the rosin, in addition to those specifically mentioned herein, in which the condensation product, formed between the color body to be removed from the rosin and the aldehyde, is insoluble or only slightly soluble.

While my invention is more particularly advantageous for the refining of wood rosin, it will be obvious that it is adaptable for the refining of rosin other than wood rosin, as for example, gum rosin.

Having now fully described my invention, what I claim and desire to protect by Letters Patent is:—

1. The method of refining rosin which includes subjecting rosin to treatment with formaldehyde and ammonia and finally to distillation.

2. The method of refining rosin which includes subjecting rosin to treatment with hexamethylenetetramine and to distillation.

3. The method of refining wood rosin which includes forming a solution of rosin in gasoline, adding to the solution hexamethylenetetramine, heating the solution for the formation of an insoluble product formed from color bodies of the rosin, separating the insoluble product formed from the gasoline-rosin solution and recovering refined rosin from the gasoline-rosin solution.

4. The method of refining wood rosin which includes forming a solution of rosin in gasoline, adding to the solution hexamethylenetetramine, heating the solution for the formation of an insoluble product with color bodies of the rosin, separating the insoluble product formed from the gasoline-rosin solution, recovering refined rosin from the gasoline-rosin solution, and subjecting the recovered rosin to distillation.

5. The method of refining rosin which includes subjecting rosin to treatment with hexamethylenetetramine.

6. In the method of refining rosin containing a latent color body the step which includes subjecting the rosin to treatment with an aliphatic aldehyde and a condensing agent.

7. In the method of refining rosin containing a latent color body the steps which include subjecting the rosin to treatment with an aliphatic aldehyde and a condensing agent to effect the formation of a reaction product by interaction of the aliphatic aldehyde and a latent color body of the rosin and separating the reaction product from the rosin.

8. In the method of refining rosin containing a latent color body the step which includes subjecting the rosin to treatment with formaldehyde and a condensing agent and separating the reaction product from the rosin.

9. In the method of refining rosin containing a latent color body the steps which include subjecting the rosin to treatment with formaldehyde and a condensing agent to effect the formation of a reaction product by interaction of the formaldehyde and a latent color body of the rosin and separating the reaction product from the rosin.

10. In the method of refining rosin containing a latent color body the steps which include subjecting the rosin to treatment with an aliphatic aldehyde and a condensing agent and then distilling the rosin.

11. In the method of refining rosin containing a latent color body the steps which include subjecting the rosin to treatment with formaldehyde and a condensing agent and then distilling the rosin.

12. In the method of refining rosin containing a latent color body the steps which include subjecting the rosin in solution in a suitable volatile organic solvent to treatment with an aliphatic aldehyde and a condensing agent and separating the reaction product from the rosin.

13. In the method of refining rosin containing a latent color body the steps which include subjecting the rosin in solution in a suitable volatile organic solvent to treatment with formaldehyde and a condensing agent.

14. In the method of refining rosin containing a latent color body the steps which include subjecting the rosin in solution in gasoline to treatment with an aliphatic aldehyde and a condensing agent and separating the reaction product from the rosin.

15. In the method of refining rosin containing a latent color body the steps which include subjecting the rosin in solution in gasoline to treatment with formaldehyde and a condensing agent and separating the reaction product from the rosin.

16. In the method of refining rosin containing a latent color body the steps which include subjecting the rosin in solution in a suitable volatile organic solvent to treatment with formaldehyde and ammonia and separating the reaction product from the rosin.

17. In the method of refining rosin containing a latent color body the steps which include subjecting the rosin in solution in gasoline to treatment with formaldehyde and ammonia and separating the reaction product from the rosin.

18. The method of refining rosin containing a latent color body which includes subjecting rosin in solution in a suitable volatile organic solvent to treatment with an aliphatic aldehyde and a condensing agent to effect the formation of a reaction product by interaction of the aldehyde and a latent color body of the rosin, separating the reaction product formed from the solution, washing the rosin solution, evaporating off the solvent and distilling the rosin.

19. The method of refining rosin containing a latent color body which includes subjecting rosin in solution in a volatile organic solvent to treatment with formaldehyde and a condensing agent to effect the formation of a reaction product by interaction of the formaldehyde and a latent color body of the rosin, separating the reaction product formed from the solution, washing the rosin solution, evaporating off the solvent and distilling the rosin.

20. In the method of refining rosin containing a latent color body the steps which include subjecting rosin to treatment with formaldehyde and ammonia and separating the reaction product from the rosin.

21. In the method of refining rosin containing a latent color body the steps which include subjecting rosin to treatment with hexamethylenetetramine and separating the reaction product from the rosin.

22. The method of refining rosin containing a latent color body which includes forming a solution of rosin in gasoline, adding to the solution hexamethylenetetramine, heating the solution for the formation of an insoluble product formed from color bodies of the rosin, separating the insoluble product formed from the gasoline-rosin solution and recovering refined rosin from the gasoline-rosin solution.

23. The method of refining rosin containing a latent color body which includes forming a solution of rosin in gasoline, adding to the solution hexamethylenetetramine, heating the solution for the formation of an insoluble product with color bodies of the rosin, separating the insoluble product formed from the gasoline-rosin solution, recovering refined rosin from the gasoline-rosin solution and subjecting the recovered rosin to distillation.

24. In the method of refining rosin containing a latent color body the step which includes subjecting rosin to treatment with hexamethylenetetramine.

25. In the method of refining rosin the step which includes subjecting rosin to treatment with trioxymethylene.

26. In the method of refining rosin the steps which include subjecting rosin to treatment with trioxymethylene and to distillation.

27. In the method of refining rosin the step which includes subjecting rosin in solution in a suitable volatile organic solvent to treatment with trioxymethylene.

28. In the method of refining rosin the steps which includes subjecting rosin in solution in gasoline to treatment with trioxymethylene.

29. In the method of refining rosin the steps which include forming a solution of rosin in a volatile organic solvent, adding trioxymethylene to the solution, heating the solution for the formation of an insoluble product formed with color bodies of the rosin, separating the insoluble product formed from the rosin solution and recovering refined rosin from the rosin solution.

30. In the method of refining rosin the steps which include forming a solution of rosin in a volatile organic solvent, adding trioxymethylene to the solution, heating the solution for the formation of an insoluble product formed with color bodies of the rosin, separating the insoluble product formed from the rosin solution, recovering refined rosin from the rosin solution and subjecting the separated rosin to distillation.

In testimony of which invention, I have hereunto set my hand, at Kenvil, N. J., on this 9th day of January, 1928.

IRVIN W. HUMPHREY.